US012361823B2

(12) United States Patent
Nemirovski et al.

(10) Patent No.: US 12,361,823 B2
(45) Date of Patent: Jul. 15, 2025

(54) INTEGRATED TRAFFIC CONTROLLER

(71) Applicant: Yunex LLC, Austin, TX (US)

(72) Inventors: Iouri Nemirovski, Austin, TX (US); Michael Gaertner, Austin, TX (US)

(73) Assignee: Yunex LLC, Austin, TX (US)

( * ) Notice: Subject to any disclaimer, the term of this patent is extended or adjusted under 35 U.S.C. 154(b) by 0 days.

(21) Appl. No.: 18/614,436

(22) Filed: Mar. 22, 2024

(65) Prior Publication Data

US 2025/0037577 A1 Jan. 30, 2025

Related U.S. Application Data

(60) Provisional application No. 63/522,706, filed on Jun. 22, 2023.

(51) Int. Cl.
*G08G 1/07* (2006.01)

(52) U.S. Cl.
CPC .................................... *G08G 1/07* (2013.01)

(58) Field of Classification Search
CPC ........................................................ G08G 1/07
USPC .......................................................... 701/117
See application file for complete search history.

(56) References Cited

U.S. PATENT DOCUMENTS 3,881,169 A * 4/1975 Malach .................. G08G 1/087 340/906
5,677,684 A * 10/1997 McArthur .............. G08G 1/087 367/199
9,747,793 B1 * 8/2017 Li .......................... G08G 1/095
10,332,393 B1 * 6/2019 Chang .................... G08G 1/056
10,818,170 B1 * 10/2020 Rangan ................. H04W 4/023
11,100,336 B2 * 8/2021 Malkes ................ G08G 1/0145
11,138,877 B2 * 10/2021 Beaulieu .................. G08G 1/07
11,594,127 B1 * 2/2023 Mulligan ............... G08G 1/095
2011/0109478 A1 5/2011 Williamson et al.
2013/0013178 A1 * 1/2013 Brant ................... G08G 1/0145 701/117
2014/0070961 A1 * 3/2014 Collar .................... G08G 1/096 340/905
2015/0256624 A1 * 9/2015 Buckel .................. H04L 67/025 709/202

(Continued)

FOREIGN PATENT DOCUMENTS

WO WO-2013110138 A1 * 8/2013 .......... G06F 11/1004

OTHER PUBLICATIONS

International Search Report and Written Opinion issued in PCT/US2024/034386, mailed Oct. 17, 2024, EPO, 6 pages.

*Primary Examiner* — Luis A Martinez Borrero
(74) *Attorney, Agent, or Firm* — Dinsmore & Shohl LLP

(57) ABSTRACT

Certain aspects of the present disclosure provide a traffic controller comprising an enclosure that houses an applications processor, the applications processor configured to execute one or more applications; a signal controller processor, the signal controller processor configured to control one or more traffic lights, wherein the applications processor is in data communication with the signal controller processor; a first memory coupled to the applications processor and a second memory coupled to the signal controller processor; one or more communication interfaces; and a retractable display assembly, the retractable display assembly comprising a touch-sensitive display, and a keypad that is adjacent to the touch-sensitive display.

23 Claims, 9 Drawing Sheets

Traffic Controller System

(56) References Cited

U.S. PATENT DOCUMENTS

| | | | | |
|---|---|---|---|---|
| 2016/0027299 | A1* | 1/2016 | Raamot | G08G 1/08 340/917 |
| 2016/0027300 | A1* | 1/2016 | Raamot | G08G 1/0145 340/922 |
| 2016/0225258 | A1* | 8/2016 | Aparicio Ojea | G08G 1/097 |
| 2018/0096597 | A1* | 4/2018 | Mortazavi | H04W 4/023 |
| 2019/0163429 | A1* | 5/2019 | Hot | G06F 3/147 |
| 2019/0311620 | A1* | 10/2019 | Curt | G08B 21/185 |
| 2020/0320871 | A1* | 10/2020 | Massarano | G08G 1/0145 |
| 2020/0342752 | A1* | 10/2020 | Beaulieu | G08G 1/07 |
| 2021/0389140 | A1* | 12/2021 | Soryal | G08G 1/07 |
| 2021/0407287 | A1* | 12/2021 | Ly | H04W 4/30 |

* cited by examiner

Traffic Controller System

INTEGRATED TRAFFIC CONTROLLER

CROSS-REFERENCE TO RELATED APPLICATIONS

This Application claims the benefit of and priority to U.S. Provisional Patent Application No. 63/522,706, filed on Jun. 22, 2023, the entire contents of which are hereby incorporated by reference.

INTRODUCTION

Technical Field

The present specification relates to integrated traffic controllers and integrated traffic controller systems.

Background

Conventional traffic controllers (e.g. controllers that control traffic control devices, such as traffic lights at intersections) present numerous challenges and limitations. For example, they lack edge processing capabilities, and are limited with respect to the presence of various traffic controller constituent components that expand upon capabilities of the traffic controller. Therefore, there is a need in the art for improved traffic controllers.

BRIEF SUMMARY

In one embodiment, a traffic controller is disclosed. The traffic controller includes an applications processor configured to execute one or more applications; a signal controller processor to control one or more traffic lights, wherein the applications processor is in data communication with the signal controller processor; a first memory coupled to the applications processor and a second memory coupled to the signal controller processor; one or more communication interfaces; and a retractable display assembly, the retractable display assembly comprising a touch-sensitive display, and a keypad that is adjacent to the touch-sensitive display.

These and additional features provided by the embodiments described herein will be more fully understood in view of the following detailed description in conjunction with the drawings.

DESCRIPTION OF THE DRAWINGS

The embodiments set forth in the drawings are illustrative and exemplary in nature and are not intended to limit the subject matter defined by the claims. The following detailed description of the illustrative embodiments can be understood when read in conjunction with the following drawings, where like structure is indicated with like reference numerals.

DETAILED DESCRIPTION

Embodiments disclosed herein relate to an integrated traffic controller that is operable as an edge device in a cloud-enabled traffic control system. Various embodiments described herein include a dual-processing architecture in which one processing subsystem is configured to control local traffic control elements (e.g., traffic lights) and a second processing subsystem is configured to implement a wide variety of applications. Beneficially, the first and second processing subsystems may share data in such a way as to improve the capability of the first processing subsystem while maintaining compliance with control processing standards.

In certain embodiments, the integrated traffic controller includes a retractable display assembly to improve user experience. Specifically, the retractable display assembly may be configured to extend and retract via an opening and a closing of a latch. In this manner, the integrated traffic controller may be more easily integrated within traffic cabinets of various sizes, while maintaining the ability to provide graphical user interfaces for user interaction. In certain embodiments, the retractable display assembly includes a touch screen color display alongside a keypad with keys, which collectively provide numerous options for enabling convenient user interaction.

In certain embodiments, the integrated traffic controller includes one or more passively cooled processing devices (e.g., processors). This beneficially reduces size, weight, and power draw (e.g., because no fan has to be powered), while also making the passively cooled components more reliable.

In certain embodiments, the integrated traffic controller includes redundant power supplies, which provides increased up-time and robustness to equipment failure.

In certain embodiments, the integrated traffic controller includes powered Ethernet ports configured to power local peripheral devices, such as power of Ethernet (PoE) cameras or sensors. Beneficially, PoE capability reduces integration complexity.

Beneficially, embodiments described herein are configured to be integrated with a variety of standard traffic cabinet types or a hybrid traffic cabinet type, such as those depicted and described below with respect to FIGS. 6, 7A-7C, 8A-8C, 9A-9B, and FIG. 10).

Example Traffic Controller System

Figure 1:
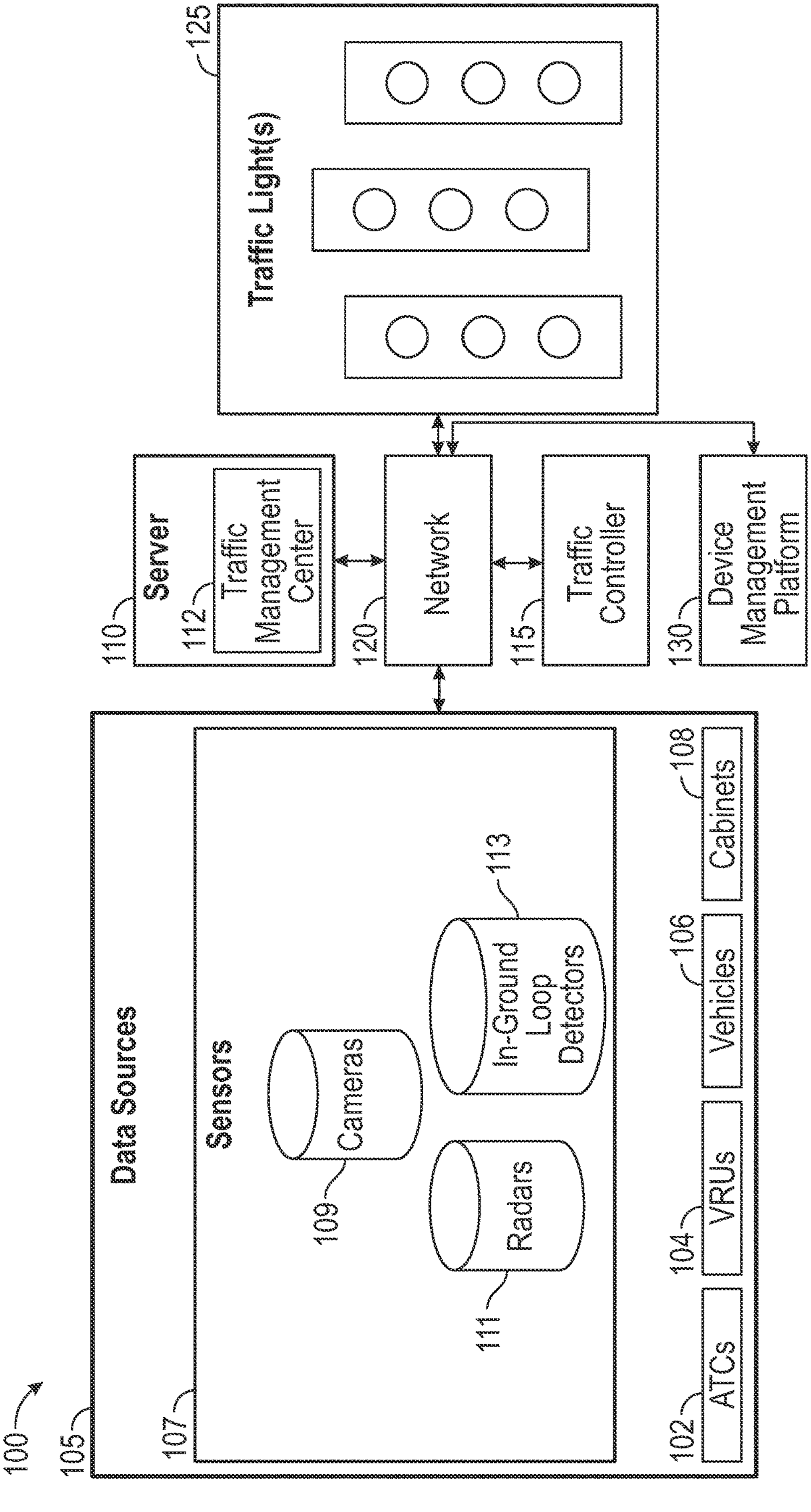
FIG. 1 depicts a schematic block diagram of a traffic controller system in accordance with exemplary embodiment.

FIG. 1 illustrates a schematic block diagram of a traffic controller system 100. As illustrated, the traffic controller system 100 comprises one or more data sources 105, a server 110, a traffic controller 115, a network 120, one or more traffic lights 125, and a device management platform 130. Although single instances of the constituent components of traffic controller system 100 are depicted in some cases, any number of the constituent components of traffic controller system 100 may be included in other examples.

The one or more data sources 105 include sensors 107, advanced traffic controller (ATCs) systems 102 (e.g., systems in which traffic signal timing changes, or adapts, based on actual traffic demand), vulnerable road users (VRUs) systems 104 (e.g., pedestrians, runners, walkers, skaters, cyclists, motorcycle operators, roadway workers), vehicles 106, cabinets systems 108 (e.g. traffic cabinets systems configured to house various types of traffic controllers, including standard size traffic cabinets), or any combination thereof. In this example, sensors 107 include cameras 109, radars 111, and in-ground loop detectors 113, though other types of traffic monitoring sensors may be used.

Each of the one or more data sources 105 is configured to transmit data, such as sensor data, to the traffic controller 115 via network 120. The traffic controller 115, also referred to herein as an integrated traffic controller, is configured to store and analyze the data received from the one or more data sources 105 to perform real-time traffic control of the one or more traffic lights 125. In some examples, the server 110 comprises a traffic management center 112 that is configured to monitor and regulate traffic flow. Data exchanged between the traffic controller 115 and the traffic management center 112 flows bidirectionally in this example. The data can also include sensor metadata that describe detected objects from each of the one or more data sources 105 and is transmitted to the traffic controller 115 via network 120; simple network management protocol (SNMP) National Transportation Communications for Intelligent Transportation Systems Protocol (NTCIP)® data that sets parameters and modes of operation of the traffic controller 115; and synchronous data link control (SLDC) data from each of the one or more data sources 105 and is transmitted to the traffic controller 115 via network 120.

The server 110 comprises a traffic management center 112 including real-time traffic information. In some examples, the server 110 includes one or more processors, which are coupled to one or more memories (not shown). The server 110 is configured as a central system or platform to control various data, such as data associated with the monitoring and regulation of traffic flow. The server 110 is configured to connect to any components of the traffic controller system 100 via network 120, which is representative of one or more public (e.g., Internet) or private networks. In certain embodiments, the server 110 is configured to poll the data from the traffic controller 115, and is configured to store this data into one or more databases (not shown). The server 110 is configured to retrieve the data from the one or more databases, based on one or more requested actions, and download the data to the traffic controller 115.

The traffic lights 125 comprises any number and type of traffic lights.

The device management platform 130 is, in certain embodiments cloud-based, and comprises a connected devices platform that is configured to, in certain embodiments, manage and monitor the traffic controller 115, including management of firmware updates of the traffic controller 115, as well as management and monitoring of any hardware device connected to the traffic controller 115. In certain embodiments, the device management platform 130 is configured to serve as an application store, from which one or more applications may be downloaded therefrom and executed on the traffic controller 115.

Example Block Diagram of Integrated Traffic Controller

Figure 2:
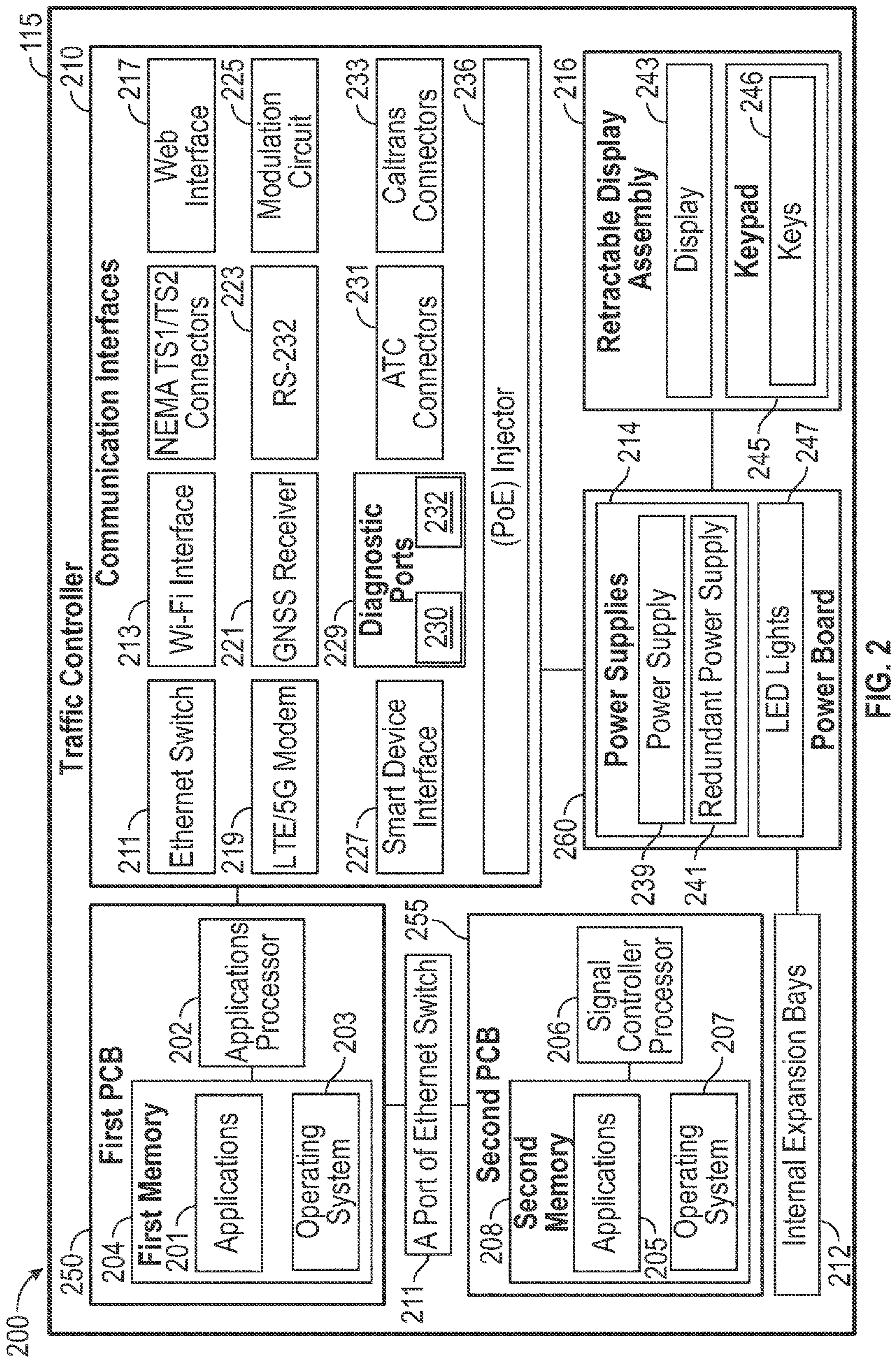
FIG. 2 depicts a schematic block diagram of a traffic controller in accordance with an exemplary embodiment.

FIG. 2 depicts a schematic block diagram of an example traffic controller 115. In certain embodiments, the traffic controller 115 may refer to the traffic controller 115 of FIG. 1.

The traffic controller 115 comprises an enclosure 200. The enclosure 200 is configured to house an applications processor 202, a first memory 204, a signal controller processor 206, a second memory 208, one or more communication interfaces 210, one or more internal expansion bays 212, one or more power supplies 214, and a retractable display assembly 216 in this example. Although single instances of the constituent components of traffic controller 115 are depicted, any number of the constituent components of traffic controller 115 may be included.

In certain embodiments, the enclosure 200 has a Slim 2U form factor.

In certain embodiments, the applications processor 202 and the signal controller processor 206 use different computing architectures. For example, in certain embodiments, the applications processor 202 comprises an advanced reduced instruction set machine (ARM) processor and the signal controller processor 206 comprises a performance computing (PowerPC) processor.

In certain embodiments, the applications processor 202 is configured to execute one or more applications. In some embodiments, the applications processor 202 is passively cooled.

A first memory 204 is coupled to the applications processor 202. The first memory 204 comprises one or more applications 201 and an operating system 203. In some examples, the one or more applications 201 include third-party applications. For example, the one or more applications 201 may include one or more of a web-based application, a cabinet status monitoring application, a travel time application, a performance data analysis application, a smart device detection application, and/or a proactive and predictive diagnostic application.

In certain embodiments, the one or more applications 201 can be downloaded and installed from an application store (not shown) that is external, such as remotely hosted, to the traffic controller 115. By way of example, the one or more applications 201 are downloaded and installed from the application store (not shown) into the first memory 204 for subsequent execution by the applications processor 202. As a consequence, functionality of the traffic controller 115 is enhanced since the traffic controller 115 is configured for compatibility with various applications, such as the one or more applications 201, that may be executed therein. In this manner, the traffic controller 115 is configured to be customized with any number of the one or more applications 201 that are installed, which may be selected for download by a user to accommodate for desired functionality needs of the traffic controller 115.

In certain embodiments, the signal controller processor 206 is configured to control the one or more traffic lights 125. The signal controller processor 206 is in data communication with the applications processor 202.

A second memory 208 is coupled to the signal controller processor 206. The second memory 208 comprises one or more applications 205 and an operating system 207. In some examples, the one or more applications 205 comprises any number of applications, including but not limited to third party applications. At least one of the one or more applications 205 comprises a traffic lights and intersection control application. In certain embodiments, the one or more applications 201 are different from the one or more applications 205. In certain embodiments, the third-party applications of the one or more applications 201 may be similar or different from the third-party applications of the one or more applications 205. In certain embodiments, the one or more applications 201 and/or the one or more applications 205 may be downloaded and installed from the application store (not shown) into respective first memory 204 and second memory 208, and can receive updates directly via the cloud (not shown). In certain embodiments, the device management platform 130 is configured to serve as the application store (not shown), from which the one or more applications 201, 205 may be downloaded therefrom and executed on the traffic controller 115.

Each of the first memory 204 and the second memory 208 comprises, without limitation, any number of non-transitory computer-readable mediums.

In some examples, the applications processor 202 and the first memory 204 reside on a first printed circuit board (PCB) 250 of the traffic controller 115. The signal controller processor 206 and the second memory 208 reside on a second PCB 255, separate from the first PCB 250, of the traffic controller 115. The one or more power supplies 214 are configured to interface with a power board 260 of the traffic controller 115. In certain embodiments, the second PCB 255 and power board 260 may each include separate printed circuit boards that are connected to each other by cable connectors.

In some examples, the applications processor 202 is in data communication with the signal controller processor 206 via one port of the Ethernet switch 211, such as via Ethernet TCP/IP.

In certain embodiments, the one or more communication interfaces 210 includes one or more of an Ethernet switch 211, a Wi-Fi interface 213, one or more National Electrical Manufacturers Association (NEMA) TS1/TS2 connectors 215, a web interface 217, a wireless communications modem 219 (e.g., 5G, LTE, etc.), a global navigation satellite system (GNSS) receiver 221, a RS-232 port 223, a modulation circuit 225, a smart device interface 227, a plurality of diagnostic ports 229, one or more Advanced Traffic Controller (ATC) connectors 231, one or more California Department of Transportation (Caltrans) connectors 233, a power over Ethernet (PoE) injector 236, and/or any combination thereof.

The Ethernet switch 211 comprises any number of Ethernet ports. In certain embodiments, the Ethernet switch 211 comprises four Ethernet ports. As discussed below, though not shown, the Ethernet switch 211 can include a PoE injector 236. In certain embodiments, two ports of the PoE injector 236 may be part of the Ethernet switch 211.

In certain embodiments, the Wi-Fi interface 213 is configured to operate in a plurality of modes. In some examples, a first mode of operation of the Wi-Fi interface 213 is configured as a Wi-Fi access point. In some examples, a second mode of operation of the Wi-Fi interface 213 is configured to collect one or more media access control (MAC) addresses passing through an intersection. In certain embodiments, the Wi-Fi interface 213 may be configured to feed the MAC addresses data to an application (including but not limited to the travel time application of one or more applications 201) allowing users to perform travel time and origin/destination analysis. The Wi-Fi interface 213 is Wi-Fi compliant, including but not limited to supporting Wi-Fi 802.11 type wireless communication standards. Though not shown, the one or more communication interfaces 210 may include other wireless technology interfaces, such as for Bluetooth® basic rate/enhanced data rate, Bluetooth Low Energy (BR/EDR/BLE), and/or the like.

The one or more NEMA TS1/TS2 connectors 215 comprises any number of NEMA TS1 connectors, any number of NEMA TS2 connectors, or any combination thereof. The one or more NEMA TS1/TS2 connectors 215 are configured for compliance with and support for NEMA standards.

The web interface 217 is an interface that is configured to expose capabilities using uniform resource locators (URLs) and web commands.

In certain embodiments, the wireless communications modem 219 comprises an LTE/5G modem.

The GNSS receiver 221 comprises a position determining receiver that, in certain embodiments, is configured with 2.0 m circular error probability (CEP) position accuracy, and Wide Area Augmentation System (WAAS) corrections support. It is understood that the GNSS receiver 221 is not limited to such only this type of CEP position accuracy, and that other types of CEP position accuracy may be used. The GNSS receiver 221 may be configured for, without limitation, one or more receiver architectures, such as GPS, Galileo, GLONASS, or Beidou. The GNSS receiver 221 is configured to provide accurate time information to the traffic controller 115 for the synchronization with devices over a network. In certain embodiments, the traffic controller 115 may be configured as an network time protocol (NTP) server that synchronizes an internal clock of a device over the network via the GNSS receiver 221.

The modulation circuit 225 is configured to implement one or more modulation schemes, such as via a frequency-shift keying (FSK) modem of an expansion serial board (not shown) of the traffic controller 115.

In certain embodiments, the smart device interface 227 comprises an Ethernet interface. For example, the Ethernet interface is configured to detect and communicate with any type of smart device for integration with the traffic controller 115. Examples of a smart device include a mobile device, a tablet, a personal computer, a sensor, an imaging device such as a camera, or the like that is detected by the traffic controller 115 via the Ethernet interface. In certain embodiments, the traffic controller 115 may be configured to utilize a plurality of smart device communication protocols to communicate over Ethernet via the smart device interface 227.

The plurality of diagnostic ports 229 comprises a first diagnostic port 230 that, in certain embodiments, is configured to provide a first connection to the applications processor 202 of the traffic controller 115, and a second diagnostic port 232 that, in certain embodiments, is configured to provide a second connection to the signal controller processor 206 of the traffic controller 115. In some examples, the first operating system comprises an operating system 203, and the second operating system comprises an operating system 207. Without limitation, the plurality of diagnostic ports 229, including the first diagnostic port 230 and the second diagnostic port 232, comprise universal serial bus Type-C (USB-C) ports. In some examples, the plurality of diagnostic ports 229 are configured to test different hardware or software processes via the operating system 203 and the operating system 207, after establishing serial connections to the applications processor 202 and the signal controller processor 206, respectively.

The one or more ATC connectors 231 are configured for compliance with and support for ATC standards.

The one or more Caltrans connectors 233 are configured for compliance with and support for California Department of Transportation standards.

The PoE injector 236 comprises circuitry that is configured to provide power to the traffic controller 115 via one or more Ethernet cables. In some examples, the PoE injector 236 is separate from Ethernet switch 211. In other examples, the PoE injector 236 is integrated (not shown) with Ethernet switch 211.

The one or more internal expansion bays 212 are each configured to accommodate, such as on a four port Ethernet expansion board and/or an expansion serial board of the traffic controller 115, one or more hardware modules. For example, the one or more hardware modules may include a mini-PCI express (mPCIe) card, a Long-Term Evolution module, a Wi-Fi module, a GPS module, and/or an image processing module.

In some examples, the enclosure 200 is further configured to house a first power supply 239 and a second power supply 241. The second power supply 241 is configured to operate as a redundant power supply, such as when the first power supply 239 becomes inoperable. In certain embodiments, a plurality of light emitting diode (LED) indicator lights 247 are placed on each of the power supplies 214 to indicate a power status of each power supply.

The retractable display assembly 216 comprises a display 243, and a keypad 245. In some examples, the display 243 comprises a touch-sensitive display with a LED backlight. In some examples, the display 243 is a full color display. In some examples, the keypad 245 is adjacent to the display 243. The keypad 245 comprises a plurality of keys 246.

The retractable display assembly 216 is configured to extend and retract at any number of positions. For example, the retractable display assembly 216 is configured to, via opening, such as release, of a latch 304 (shown in FIG. 3A), extend from a first state, such as an initial, retracted state, to a second, extended state. The retractable display assembly 216 is configured to, via closing of the latch 304, retract from the second state to the first state and vice versa. In some examples, the retractable display assembly 216 is configured to extend, via a slide rail system that is secured to the enclosure 200, out of the enclosure 200 to a predetermined position. In some examples, the latch 304 is integrated with a surface, such as an upper surface, of the retractable display assembly 216. In certain embodiments, the retractable display assembly 216 is closed to preserve power and save space within a type of traffic cabinet.

In certain embodiments, the traffic controller 115 is configured to be integrated in a plurality of cabinet types and mountings. In some examples, the traffic controller 115 is configured to be integrated in a standardized traffic cabinet. By way of example, the traffic controller is configured to be integrated in a NEMA TS1 cabinet, a NEMA TS2 cabinet, an ATC cabinet, or a Caltrans cabinet. In other examples, the traffic controller 115 is configured to be integrated in a non-standardized traffic cabinet.

In some examples, the traffic controller 115 is configured to be integrated in a NEMA TS2/ATC hybrid cabinet. In some examples, the traffic controller 115 is configured to be integrated in an ATC/TS1 or TS2 hybrid cabinet.

In some examples, the traffic controller 115 is configured to be shelf-mounted in a traffic cabinet that is standardized or non-standardized. In some examples, the traffic controller 115 is configured to be rack-mounted in a traffic cabinet that is standardized or non-standardized.

In some examples, the traffic controller 115 is configured for compatibility with one or more of NEMA, ATC 5201 v06, National Transportation Communications for Intelligent Transportation Systems Protocol (NTCIP) 1202 and NTCIP 1211 standards. In some examples, the traffic controller 115 may be configured for compliance with Cellular Telephone Industries Association (CTIA) Cybersecurity Certification.

In certain embodiments, the traffic controller 115 is configured for 3.5" height, 17.3" width, and 11.5" depth dimensions. In certain embodiments, the traffic controller 115 is configured to weigh 15 pounds. In certain embodiments, the operational temperature range of the traffic controller 115 is −34 degrees Celsius to 74 degrees Celsius. It is understood that these dimensions, weight, and operational temperature range of the traffic controller 115 are examples, and that other dimensions, weight, and operational temperature range of the traffic controller 115 are within the scope of the disclosure.

Example Extended and Retracted States for Integrated Traffic Controller

Figure 3A:
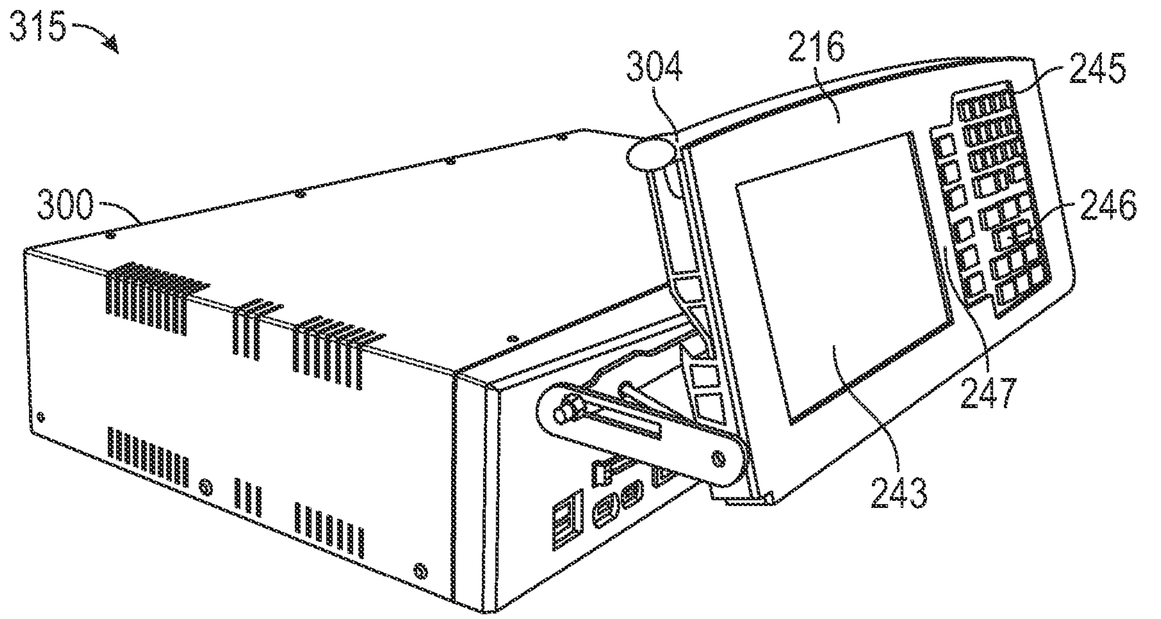
FIG. 3A depicts a perspective view of a traffic controller illustrating an extended retractable display assembly in accordance with an exemplary embodiment.

FIG. 3A depicts a perspective view of a traffic controller 315 with an extended retractable display assembly in accordance with an exemplary embodiment. In certain aspects, traffic controller 315 is an example of traffic controller 115 of FIG. 1 and/or traffic controller 115 of FIG. 2. The traffic controller 315 comprises an enclosure 300 (e.g., corresponding to enclosure 200 of FIG. 2) and a retractable display assembly 216. The retractable display assembly 216 comprises a display 243, and a keypad 245 including keys 246.

As depicted, the retractable display assembly 216 is extended out from the enclosure 200. In some examples, the retractable display assembly 216 is extended, via actuation of a latch 304, from a first state to a second state. The first state comprises a state in which the retractable display assembly 216 is fully retracted within the enclosure 200. The second state comprises a state in which the retractable display assembly 216 is fully extended from the enclosure 200. The latch 304 is configured to extend and retract the retractable display assembly 216, such as sliding and pulling to open the retractable display assembly 216. It should be understood that the extension and retraction of the retractable display assembly 216 includes not only fully extended and fully retracted states, but also partially extended and partially retracted states via actuation of the latch 304.

Figure 3B:
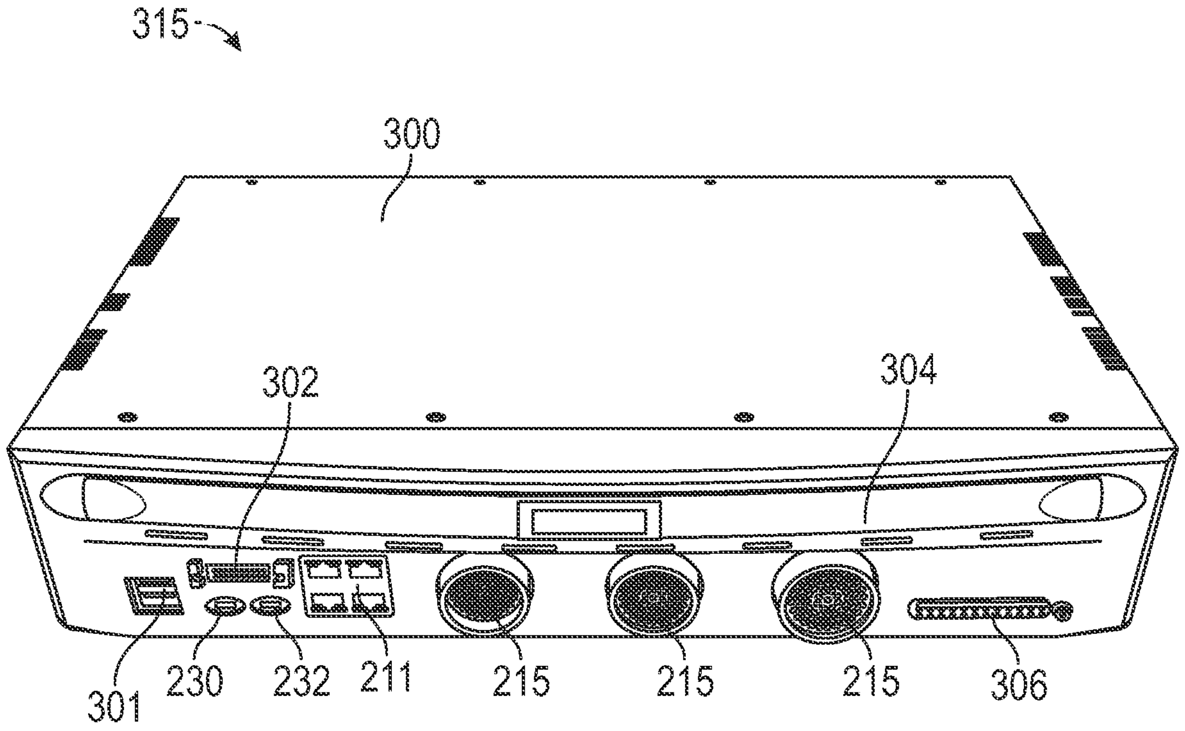
FIG. 3B depicts another perspective view of the traffic controller of FIG. 3A illustrating a retracted retractable display assembly in accordance with an exemplary embodiment.

FIG. 3B depicts another perspective view of the traffic controller 315 of FIG. 3A illustrating a retracted retractable display assembly in accordance with an exemplary embodiment. The traffic controller 315 comprises an enclosure 300, a USB-C 3.0 port 301, an SDLC port 302, a first diagnostic port 230, a second diagnostic port 232, an Ethernet switch 211, one or more NEMA TS1/TS2 connectors 215, a latch 304, and a D OPT port 306.

The SDLC port 302 comprises a synchronous data link control port that is configured to communicate with the one or more hardware modules, the one or more hardware modules corresponding to those (as previously explained above) that are configured for accommodation in the one or more internal expansion bays 212. The D OPT port 306 comprises an optional port configured for discrete input/output communication. By way of example, the D OPT port 306 is configured to determine the presence or absence of an electrical signal, such as a plurality of states in a binary manner that includes a zero (off state) or a one (on state). This allows the traffic controller 315 to understand what device connected thereto is actuated or unactuated. As depicted, the retractable display assembly 216 is configured to fully retract within the enclosure 200 from the second state to the first state via actuation of the latch 304. In some examples, the USB-C 3.0 port 301, the SDLC port 302, and the D OPT port 306 are included in the one or more communication interfaces 210.

Example Perspective View for Power Supplies of Integrated Traffic Controller

Figure 4:
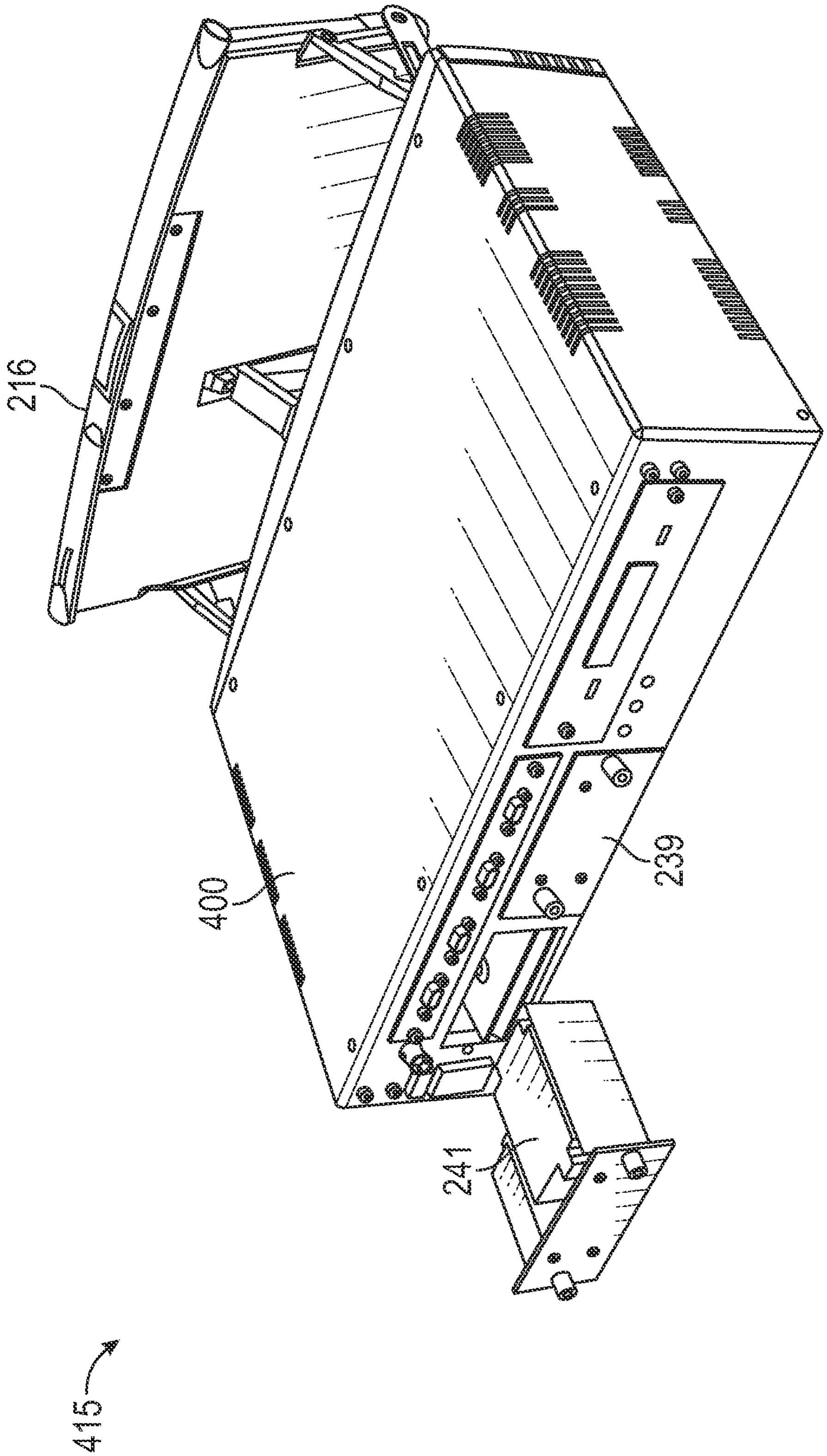
FIG. 4 depicts a perspective view of a traffic controller with a redundant power supply in accordance with an exemplary embodiment.

FIG. 4 depicts a perspective view of a traffic controller 415 with a redundant power supply in accordance with an exemplary embodiment. In certain aspects, traffic controller 415 is an example of traffic controller 115 of FIG. 1 and/or traffic controller 115 of FIG. 2 and/or traffic controller 315 of FIG. 3A and/or FIG. 3B. The traffic controller 415 comprises an enclosure 400 (e.g., corresponding to enclosure 200 of FIG. 2 and/or enclosure 300 of FIG. 3A and/or FIG. 3B). The traffic controller 415 comprises a retractable display assembly 216, a first power supply 239, and a second power supply 241. The second power supply 241 comprises a redundant power supply when the first power supply 239 becomes inoperable.

Example Perspective View for Processor of Integrated Traffic Controller

Figure 5:
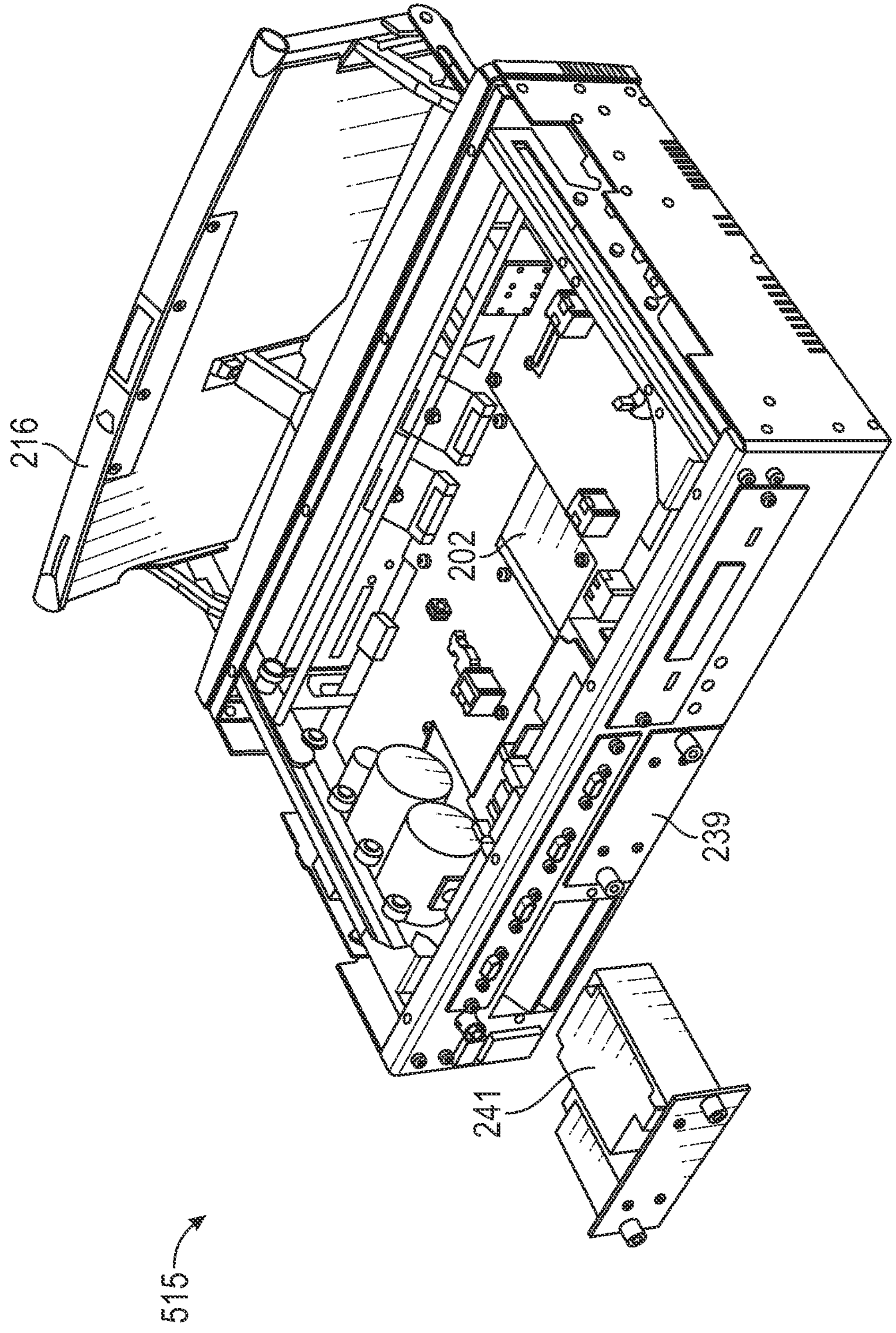
FIG. 5 depicts a perspective view of a traffic controller with a processor in accordance with an exemplary embodiment.

FIG. 5 depicts a perspective view of a traffic controller 515 with a processor in accordance with an exemplary embodiment. In certain aspects, traffic controller 515 is an example of traffic controller 115 of FIG. 1 and/or traffic controller 115 of FIG. 2 and/or traffic controller 315 of FIG. 3A and/or FIG. 3B and/or traffic controller 415 of FIG. 4. The traffic controller 515 comprises an applications processor 202, a retractable display assembly 216, a first power supply 239, and a second power supply 241. While an enclosure, such as enclosure 200 of FIG. 2 and/or enclosure 300 of FIG. 3A and/or FIG. 3B and/or enclosure 400 of FIG. 4 may be included as part of the traffic controller 515, a portion of the enclosure is shown as removed so as to expose an interior portion of the traffic controller 515.

Example Front View for Integrated Traffic Controller in a NEMA TS1/TS2 Cabinet

Figure 6:
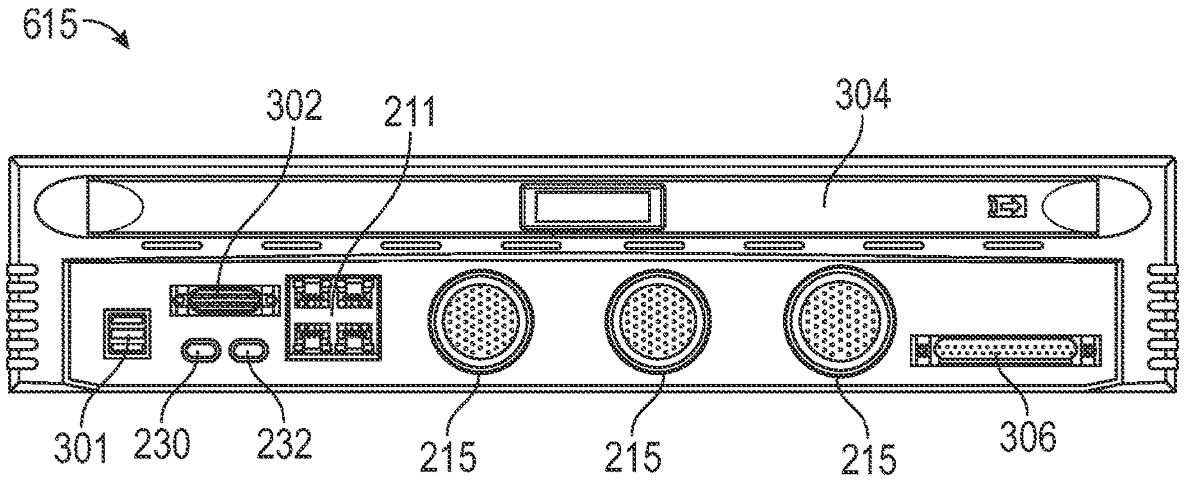
FIG. 6 depicts a front view of a traffic controller configured for integration in a NEMA TS1/TS2 cabinet in accordance with an exemplary embodiment.

FIG. 6 depicts a front view of a traffic controller 615 configured for integration in a NEMA TS1/TS2 cabinet in accordance with an exemplary embodiment. In certain aspects, traffic controller 615 is an example of traffic controller 115 of FIG. 1 and/or traffic controller 115 of FIG. 2 and/or traffic controller 315 of FIG. 3A and/or FIG. 3B and/or traffic controller 415 of FIG. 4 and/or traffic controller 515 of FIG. 5. The traffic controller 615 comprises a USB-C 3.0 port 301, a SDLC port 302, a latch 304, and a D OPT port 306, a first diagnostic port 230, a second diagnostic port 232, an Ethernet switch 211, and one or more NEMA TS1/TS2 connectors 215.

Example Views for Integrated Traffic Controller in an ATC Cabinet

Figure 7A:
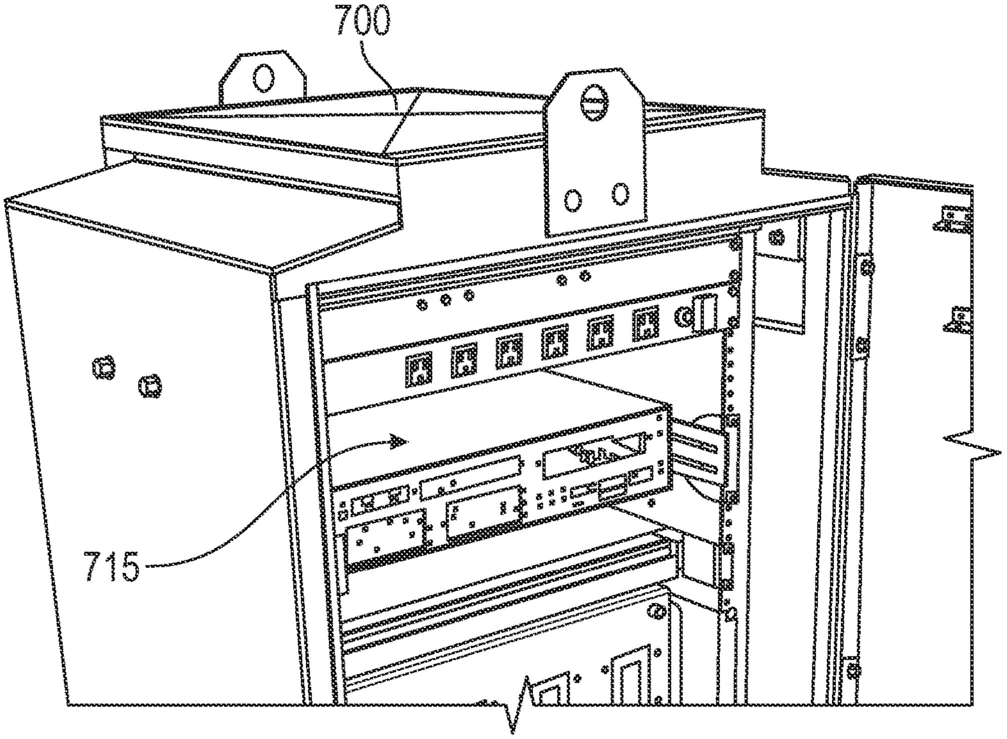
FIG. 7A depicts a perspective view of a traffic controller configured for integration in an ATC cabinet in accordance with an exemplary embodiment.

FIG. 7A depicts a perspective view of a traffic controller 715 configured for integration in an ATC cabinet 700 in accordance with an exemplary embodiment. In certain aspects, traffic controller 715 is an example of traffic controller 115 of FIG. 1 and/or traffic controller 115 of FIG. 2 and/or traffic controller 315 of FIG. 3A and/or FIG. 3B and/or traffic controller 415 of FIG. 4 and/or traffic controller 515 of FIG. 5 and/or traffic controller 615 of FIG. 6. For example, traffic controller 715 is configured for integration in ATC cabinet 700. In this depiction, the rear portion of the ATC cabinet 700 is exposed, and the rear portion of the traffic controller 715 is exposed.

Figure 7B:
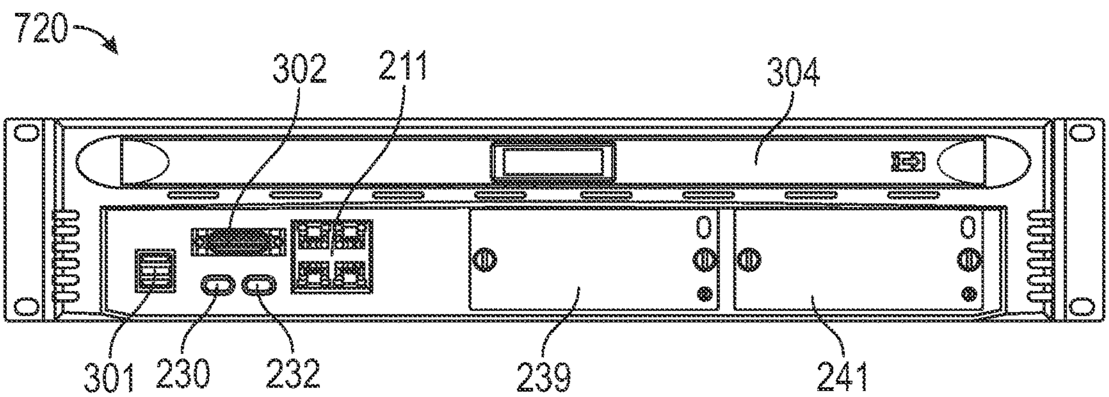
FIG. 7B depicts a front view of a traffic controller configured for integration in an ATC cabinet in accordance with an exemplary embodiment.

FIG. 7B depicts a front view of a traffic controller 720 configured for integration in an ATC cabinet 700 in accordance with an exemplary embodiment. In certain aspects, traffic controller 720 is an example of traffic controller 115 of FIG. 1 and/or traffic controller 115 of FIG. 2 and/or traffic controller 315 of FIG. 3A and/or FIG. 3B and/or traffic controller 415 of FIG. 4 and/or traffic controller 515 of FIG. 5 and/or traffic controller 615 of FIG. 6 and/or traffic controller 715 of FIG. 7A. The traffic controller 720 comprises a USB-C 3.0 port 301, a SDLC port 302, a latch 304, and a D OPT port 306, a first diagnostic port 230, a second diagnostic port 232, an Ethernet switch 211, a first power supply 239, and a second power supply 241.

Figure 7C:
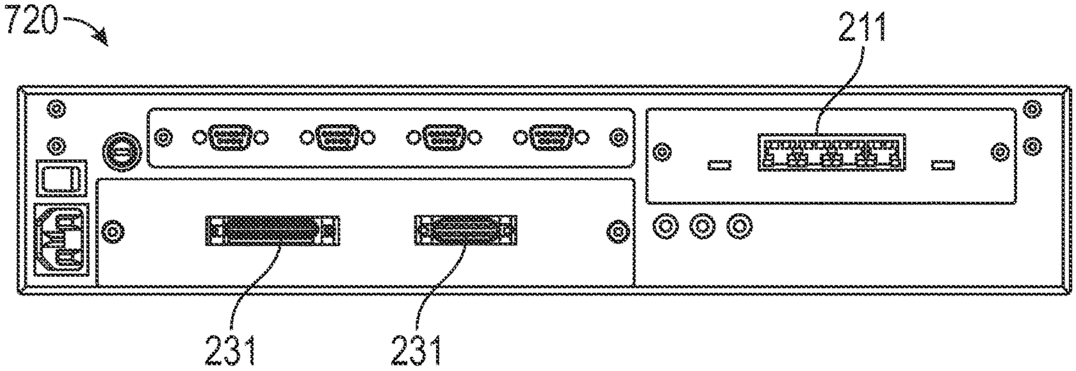
FIG. 7C depicts a rear view of the traffic controller of FIG. 7B configured for integration in an ATC cabinet in accordance with an exemplary embodiment.

FIG. 7C depicts a rear view of a traffic controller (e.g., corresponding to traffic controller 720 of FIG. 7B) configured for integration in an ATC cabinet in accordance with an exemplary embodiment. The traffic controller 720 comprises one or more ATC connectors 231 and an Ethernet switch 211.

Example Views for Integrated Traffic Controller in a Caltrans 33X Cabinet

Figure 8A:
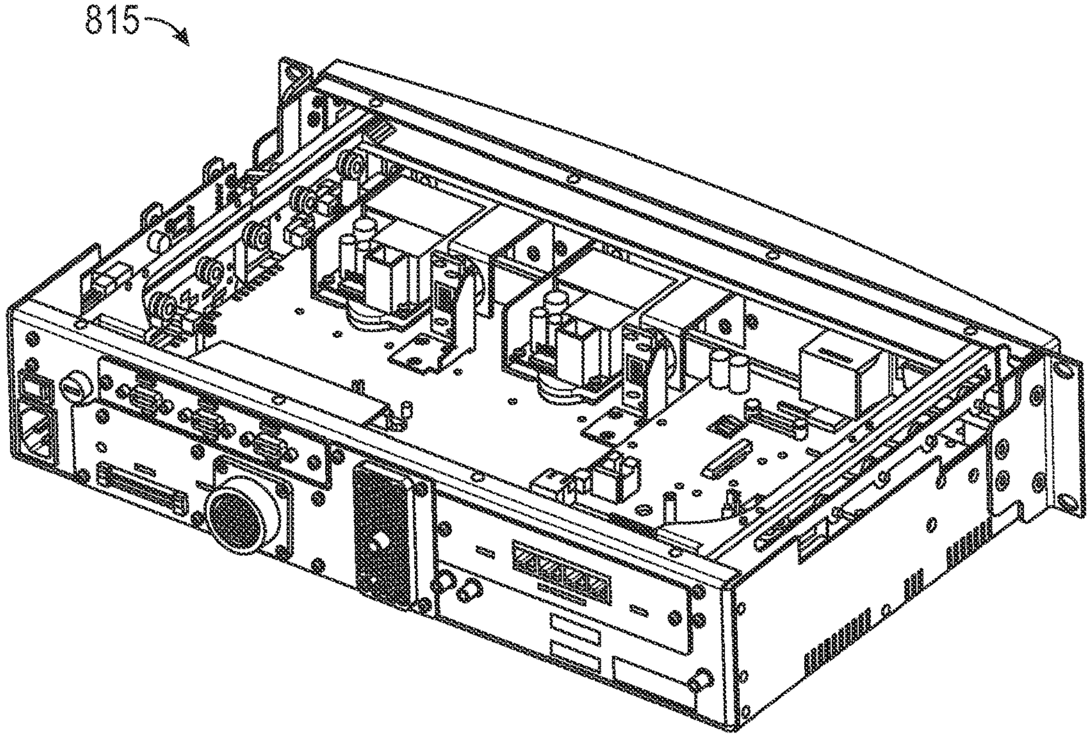
FIG. 8A depicts a perspective view of a traffic controller configured for integration in a Caltrans 33X cabinet in accordance with an exemplary embodiment.

FIG. 8A depicts a perspective view of a traffic controller 815 configured for integration in a Caltrans 33X cabinet in accordance with an exemplary embodiment. In certain aspects, traffic controller 815 is an example of traffic controller 115 of FIG. 1 and/or traffic controller 115 of FIG. 2 and/or traffic controller 315 of FIG. 3A and/or FIG. 3B. While an enclosure, and in certain embodiments, such as enclosure 200 of FIG. 2 and/or enclosure 300 of FIG. 3A and/or FIG. 3B and/or enclosure 400 of FIG. 4 may be included as part of the traffic controller 815, the enclosure is removed so as to expose an interior portion of the traffic controller 815.

Figure 8B:
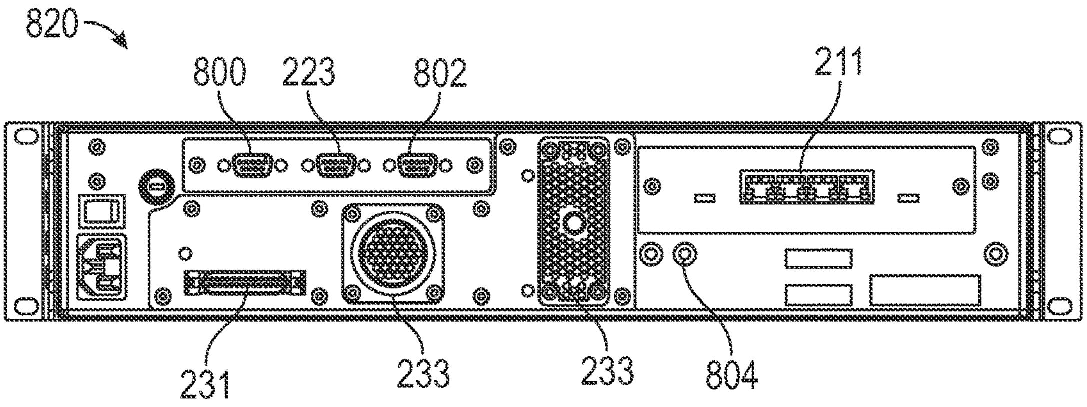
FIG. 8B depicts a rear view of a traffic controller configured for integration in a Caltrans 33X cabinet in accordance with an exemplary embodiment.

FIG. 8B depicts a rear view of a traffic controller 820 configured for integration in a Caltrans 33X cabinet in accordance with an exemplary embodiment. In certain aspects, traffic controller 820 is an example of traffic controller 115 of FIG. 1 and/or traffic controller 115 of FIG. 2 and/or traffic controller 315 of FIG. 3A and/or FIG. 3B and/or traffic controller 815 of FIG. 8A. The traffic controller 820 comprises a GPS port 800, an RS-232 port 223, a modulation circuit port 802, a modem port 804, an Ethernet switch 211, one or more ATC connectors 231, and one or more Caltrans connectors 233.

The GPS port 800 is a port that is configured for GPS operation via communication with a GPS module. The modulation circuit port 802 is a port that is configured for communication with a modulation circuit, such as the modulation circuit 225 in FIG. 2, such as via frequency-shift keying (FSK) modulation scheme. The modem port 804 is a port that is configured for communication with a modem, such as the wireless communications modem 219. In some examples, the GPS port 800, the modulation circuit port 802, and the modem port 804 are included in the one or more communication interfaces 210.

Figure 8C:
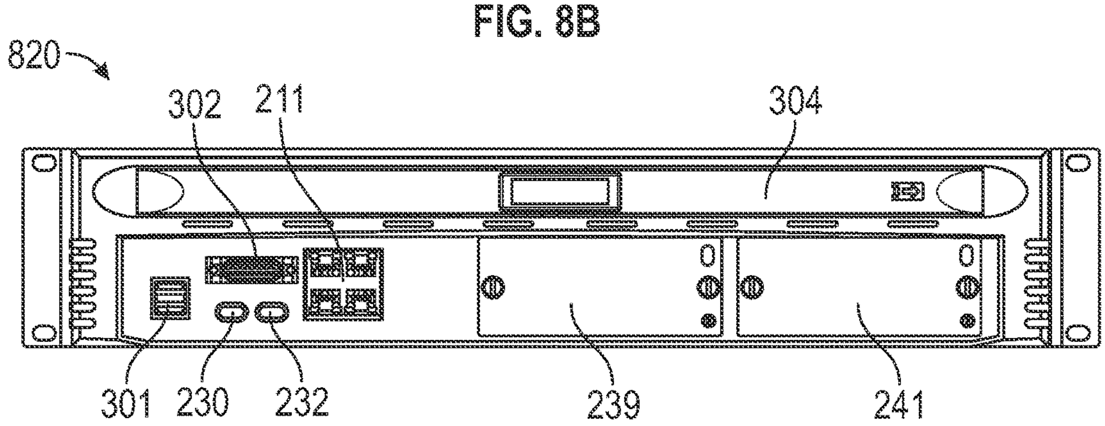
FIG. 8C depicts a front view of the traffic controller of FIG. 8B configured for integration in a Caltrans 33X cabinet in accordance with an exemplary embodiment.

FIG. 8C depicts a front view of a traffic controller (e.g., corresponding to traffic controller 820 of FIG. 8B) configured for integration in a Caltrans 33X cabinet in accordance with an exemplary embodiment. The traffic controller 820 comprises a USB-C 3.0 port 301, a SDLC port 302, a latch 304, a first diagnostic port 230, a second diagnostic port 232, an Ethernet switch 211, a first power supply 239, and a second power supply 241.

Figure 9A:
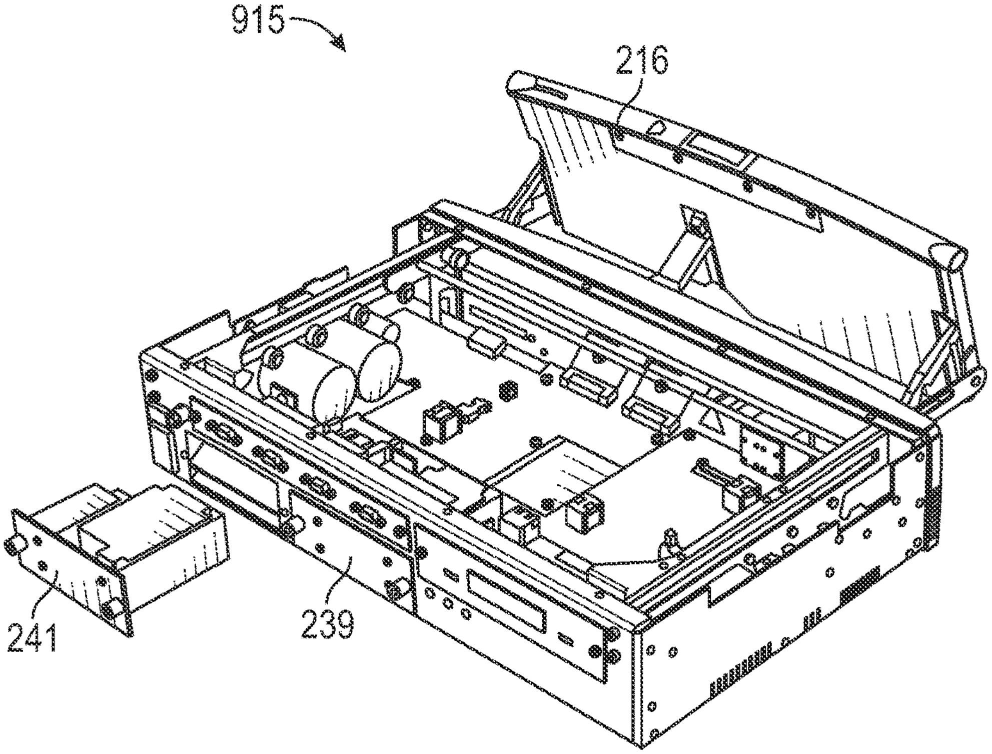
FIG. 9A depicts a perspective view of a traffic controller configured for integration in a NEMA TS2/ATC hybrid cabinet in accordance with an exemplary embodiment.

Example Views for Integrated Traffic Controller in a NEMA TS2/ATC Hybrid Cabinet FIG. 9A depicts a perspective view of a traffic controller 915 configured for integration in a NEMA TS2/ATC hybrid cabinet in accordance with an exemplary embodiment. In certain aspects, traffic controller 915 is an example of traffic controller 115 of FIG. 1 and/or traffic controller 115 of FIG. 2 and/or traffic controller 315 of FIG. 3A and/or FIG. 3B. The traffic controller 915 comprises a retractable display assembly 216, a first power supply 239, and a second power supply 241. Although single instances of the constituent components of traffic controller 915 are depicted, any number of the constituent components of traffic controller 915 may be included.

While an enclosure, and in certain embodiments, such as enclosure 200 of FIG. 2 and/or enclosure 300 of FIG. 3A and/or FIG. 3B and/or enclosure 400 of FIG. 4 may be included as part of the traffic controller 915, the enclosure is depicted partially removed so as to expose an interior portion of the traffic controller 915.

Figure 9B:
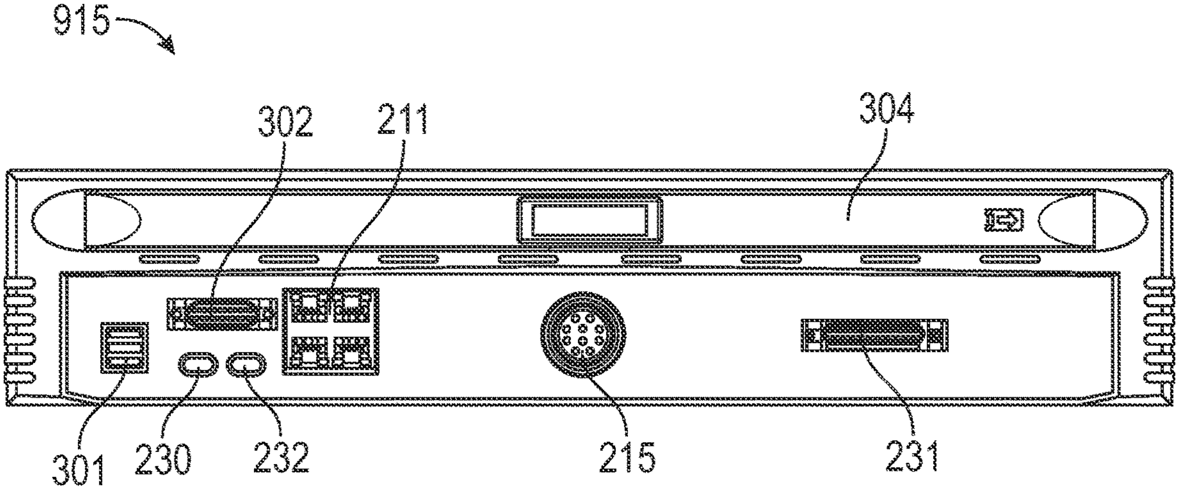
FIG. 9B depicts a front view of the traffic controller of FIG. 9A configured for integration in a NEMA TS2/ATC hybrid cabinet in accordance with an exemplary embodiment.

FIG. 9B depicts a front view of a traffic controller (e.g., corresponding to traffic controller 915 of FIG. 9A) configured for integration in a NEMA TS2/ATC hybrid cabinet in accordance with an exemplary embodiment. The traffic controller 915 comprises a USB-C 3.0 port 301, a SDLC port 302, a latch 304, a first diagnostic port 230, a second diagnostic port 232, an Ethernet switch 211, one or more NEMA TS1/TS2 connectors 215, and one or more ATC connectors 231.

Figure 10:
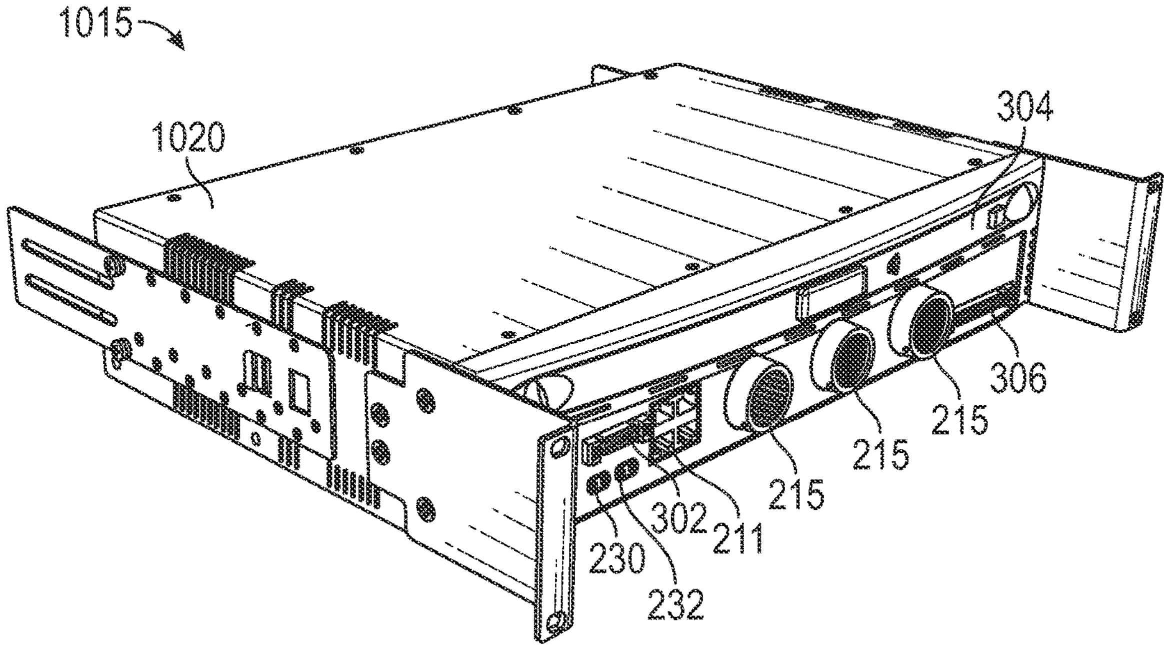
FIG. 10 depicts a perspective view of a traffic controller configured for integration in a ATC/TS1 or TS2 hybrid cabinet in accordance with an exemplary embodiment.

Example View for Integrated Traffic Controller in an ATC/TS1 or TS2 Hybrid Cabinet FIG. 10 depicts a perspective view of a traffic controller 1015 configured for integration in an ATC/TS1 or TS2 hybrid cabinet in accordance with an exemplary embodiment. In certain aspects, traffic controller 1015 is an example of traffic controller 115 of FIG. 1 and/or traffic controller 115 of FIG. 2 and/or traffic controller 315 of FIG. 3A and/or FIG. 3B. The traffic controller 1015 comprises an enclosure 1020, such as enclosure 200 of FIG. 2 and/or enclosure 300 of FIG. 3A and/or FIG. 3B and/or enclosure 400 of FIG. 4, a SDLC port 302, a latch 304, a first diagnostic port 230, a second diagnostic port 232, an Ethernet switch 211, one or more NEMA TS1/TS2 connectors 215, and D OPT port 306.

EXAMPLE CLAUSES

Implementation examples are described in the following numbered clauses:

Clause 1: A traffic controller comprising: an enclosure housing: an applications processor configured to execute one or more applications; a signal controller processor configured to control one or more traffic lights, wherein the applications processor is in data communication with the signal controller processor; a first memory coupled to the applications processor and a second memory coupled to the signal controller processor; one or more communication interfaces; and a retractable display assembly, the retractable display assembly comprising a touch-sensitive display, and a keypad that is adjacent to the touch-sensitive display.

Clause 2: The traffic controller of Clause 1, wherein the retractable display assembly further comprises a LED backlight.

Clause 3: The traffic controller of any of the above Clauses, wherein the applications processor is passively cooled using cabinet airflow.

Clause 4: The traffic controller of any of the above Clauses, wherein the retractable display assembly is configured to, via opening of a latch, extend from a first state to a second state and wherein the retractable display assembly is configured to, via closing of the latch, retract from the second state to the first state.

Clause 5: The traffic controller of any of the above Clauses, wherein the one or more communication interfaces comprises a Wi-Fi interface that is configured to operate in a plurality of modes.

Clause 6: The traffic controller of Clause 5, wherein a first mode of operation of the Wi-Fi interface is configured as a Wi-Fi access point.

Clause 7: The traffic controller of Clauses 5-6, wherein a second mode of operation of the Wi-Fi interface is configured to collect one or more MAC addresses.

Clause 8: The traffic controller of any of the above Clauses, wherein the one or more communication interfaces comprises a global navigation satellite system receiver, a RS-232 port, a modulation circuit, or any combination thereof.

Clause 9: The traffic controller of any of the above Clauses, further comprising a first power supply and a second power supply, the second power supply configured to operate as a redundant power supply.

Clause 10: The traffic controller of any of the above Clauses, wherein the signal controller processor is configured to perform real-time traffic intersection control based on received sensor data from one or more data sources and received traffic data from one or more servers.

Clause 11: The traffic controller of any of the above Clauses, wherein the traffic controller is configured to be integrated in a NEMA TS2/ATC hybrid cabinet.

Clause 12: The traffic controller of any of the above Clauses, wherein the traffic controller is configured to be integrated in an ATC/TS1 or TS2 hybrid cabinet.

Clause 13: The traffic controller of any of the above Clauses, further comprising one or more internal expansion bays configured to accommodate one or more hardware modules.

Clause 14: The traffic controller of any of the above Clauses, wherein the one or more communication interfaces comprises a smart device detection interface.

Clause 15: The traffic controller of any of the above Clauses, wherein the retractable display assembly is configured to extend, via a slide rail system that is secured to the enclosure, out of the enclosure to a vertical position.

Clause 16: The traffic controller of any of the above Clauses, wherein the one or more communication interfaces comprises a first diagnostic port that is configured to provide a first connection to the applications processor, and a second diagnostic port that is configured to provide a second connection to the signal control processor.

Clause 17: The traffic controller of any of the above Clauses, further comprising a web interface and a multi-port Ethernet switch.

Clause 18: The traffic controller of any of the above Clauses, wherein the applications processor is in data communication with the signal controller processor via Ethernet TCP/IP.

Clause 19: The traffic controller of any of the above Clauses, wherein the one or more communication interfaces comprises a built-in PoE injector.

Clause 20: The traffic controller of any of the above Clauses, further comprising an Ethernet switch including a plurality of ports.

Clause 21: The traffic controller of any of the above Clauses, wherein the applications processor and the first memory reside on a first printed circuit board, and the signal controller processor and the second memory reside on a second printed circuit board separate from the first printed circuit board.

Clause 22: The traffic controller of any of the above Clauses, wherein the applications processor uses a first computing architecture and the signal controller processor uses a second computing architecture.

Clause 23: The traffic controller of Clause 22, wherein the applications processor uses a first computing architecture and the signal controller processor uses a second computing architecture.

ADDITIONAL CONSIDERATIONS

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word “exemplary” means “serving as an example, instance, or illustration.” Any aspect described herein as “exemplary” is not necessarily to be construed as preferred or advantageous over other aspects.

As used herein, a phrase referring to “at least one of” a list of items refers to any combination of those items, including single members. As an example, “at least one of: a, b, or c” is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c). Reference to an element in the singular is not intended to mean only one unless specifically so stated, but rather “one or more.” For example, reference to an element (e.g., “a processor,” “a memory,” etc.), unless otherwise specifically stated, should be understood to refer to one or more elements (e.g., “one or more processors,” “one or more memories,” etc.). The terms “set” and “group” are intended to include one or more elements, and may be used interchangeably with “one or more.” Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions. Unless specifically stated otherwise, the term “some” refers to one or more.

As used herein, the term “determining” encompasses a wide variety of actions. For example, “determining” may include calculating, computing, processing, deriving, investigating, looking up (e.g., looking up in a table, a database or another data structure), ascertaining and the like. Also, “determining” may include receiving (e.g., receiving information), accessing (e.g., accessing data in a memory) and the like. Also, “determining” may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the embodiments shown herein, but are to be accorded the full scope consistent with the language of the claims. Within a claim, reference to an element in the singular is not intended to mean “one and only one” unless specifically so stated, but rather “one or more.” Unless specifically stated otherwise, the term “some” refers to one or more. No claim element is to be construed under the provisions of 35 U.S.C. § 112(f) unless the element is expressly recited using the phrase “means for” or, in the case of a method claim, the element is recited using the phrase “step for.” All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A traffic controller comprising:

an enclosure housing:

an applications processor configured to execute one or more applications;

a signal controller processor configured to control one or more traffic lights, wherein the applications processor is in data communication with the signal controller processor;

a first memory coupled to the applications processor and a second memory coupled to the signal controller processor;

one or more communication interfaces; and a retractable display assembly, the retractable display assembly comprising a touch-sensitive display, and a keypad that is adjacent to the touch-sensitive display.

2. The traffic controller of claim 1, wherein the retractable display assembly further comprises keypad LED backlight.

3. The traffic controller of claim 1, wherein the applications processor is passively cooled using cabinet airflow.

4. The traffic controller of claim 1, wherein the retractable display assembly is configured to, via opening of a latch, extend from a first state to a second state and wherein the retractable display assembly is configured to, via closing of the latch, retract from the second state to the first state.

5. The traffic controller of claim 1, wherein the one or more communication interfaces comprises a Wi-Fi interface that is configured to operate in a plurality of modes.

6. The traffic controller of claim 5, wherein a first mode of operation of the Wi-Fi interface is configured as a Wi-Fi access point.

7. The traffic controller of claim 5, wherein a second mode of operation of the Wi-Fi interface is configured to collect one or more MAC addresses.

8. The traffic controller of claim 1, wherein the one or more communication interfaces comprises a global navigation satellite system receiver, a RS-232 port, a modulation circuit, or any combination thereof.

9. The traffic controller of claim 1, further comprising a first power supply and a second power supply, the second power supply configured to operate as a redundant power supply.

10. The traffic controller of claim 1, wherein the signal controller processor is configured to perform real-time traffic intersection control based on received sensor data from one or more data sources and received traffic data from one or more servers.

11. The traffic controller of claim 1, wherein the traffic controller is configured to be integrated in a NEMA TS2/ATC hybrid cabinet.

12. The traffic controller of claim 1, wherein the traffic controller is configured to be integrated in an ATC/TS1 or TS2 hybrid cabinet.

13. The traffic controller of claim 1, further comprising one or more internal expansion bays configured to accommodate one or more hardware modules.

14. The traffic controller of claim 1, wherein the one or more communication interfaces comprises a smart device detection interface.

15. The traffic controller of claim 1, wherein the retractable display assembly is configured to extend, via a slide rail system that is secured to the enclosure, out of the enclosure to a vertical position.

16. The traffic controller of claim 1, wherein the one or more communication interfaces comprises a first diagnostic port that is configured to provide a first connection to the applications processor, and a second diagnostic port that is configured to provide a second connection to the signal controller processor.

17. The traffic controller of claim 1, further comprising a web interface and a multi-port Ethernet switch.

18. The traffic controller of claim 1, wherein the applications processor is in data communication with the signal controller processor via Ethernet TCP/IP.

19. The traffic controller of claim 1, wherein the one or more communication interfaces comprises a built-in PoE injector.

20. The traffic controller of claim 1, further comprising an Ethernet switch including a plurality of ports.

21. The traffic controller of claim 1, wherein the applications processor and the first memory reside on a first printed circuit board, and the signal controller processor and the second memory reside on a second printed circuit board separate from the first printed circuit board.

22. The traffic controller of claim 1, wherein the applications processor uses a first computing architecture and the signal controller processor uses a second computing architecture.

23. The traffic controller of claim 22, wherein the first computing architecture comprises an advanced reduced instruction set machine (ARM) processor and the second computing architecture comprises a performance computing (PowerPC) processor.

* * * * *